March 20, 1945.  C. W. LA PIERRE  2,371,963
SCANNING APPARATUS FOR MOVING STRIP
Filed Jan. 7, 1944

Inventor:
Cramer W. La Pierre,
by Harry E. Dunham
His Attorney.

Patented Mar. 20, 1945

2,371,963

UNITED STATES PATENT OFFICE 2,371,963

SCANNING APPARATUS FOR MOVING STRIP

Cramer W. La Pierre, Schenectady, N. Y., assignor to General Electric Company, a corporation of New York Application January 7, 1944, Serial No 517,342

2 Claims. (Cl. 88—14)

My invention relates to apparatus for scanning a moving strip such, for example, as a strip of paper or fabric for the purpose of detecting therein spots or imperfections that may be present. It is the object of my invention to provide improved apparatus of this character which is simple in construction, reliable in operation, and inexpensive to manufacture.

My invention will be better understood from the following description taken in connection with the accompanying drawing and its scope will be pointed out in the appended claims.

Figure 1:
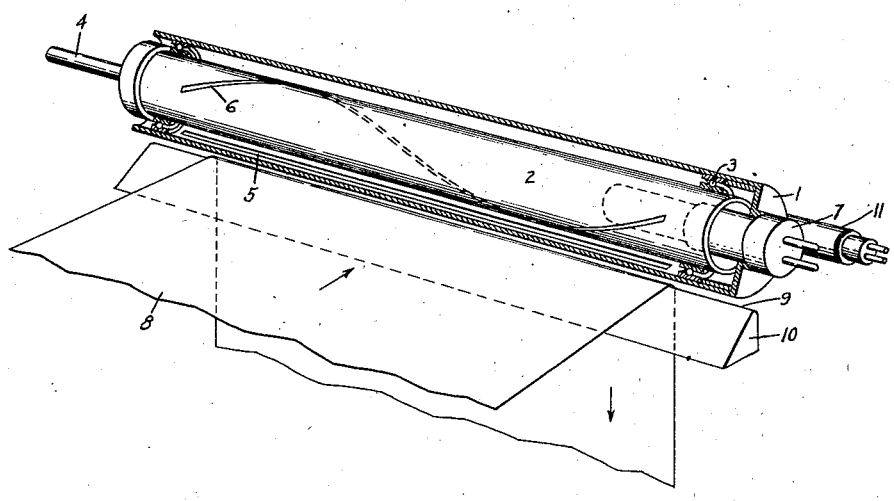
Figure 2:
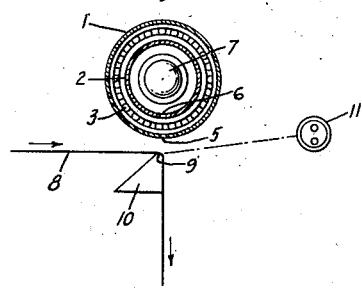

Referring to the drawing, Fig. 1 is a perspective view of an embodiment of my invention and Fig. 2 is a cross section thereof.

The fixed cylindrical supporting casing 1 has the tubular member 2 mounted within it on the ball bearings 3 shown adjacent to the opposite ends thereof, the member being rotated by any suitable means applied to the shaft 4 which projects from one end thereof. The casing 1 has the narrow straight light slit 5 extending lengthwise thereof and cooperating with that slit is the narrow spiral light slit 6 in the tubular member 2. The latter slit makes one complete turn. Where it crosses the straight slit, light from the exterior of the casing may enter the tubular member through the resulting small diamond shaped aperture which rapidly travels in one direction along the straight slit as the tubular member is rotated. The interior surface of the tubular member is given a coating of a white highly reflecting material and entering one end of the member is the photoelectric tube 7 which is mounted in one end of the casing 1. The tubular member thus functions also as an integrating sphere whereby the photoelectric tube responds to variations of the light entering the member regardless of the position of the point of intersection of the two slits.

The moving strip 8 which is to be examined is drawn by suitable means, not shown, over the edge portion 9 of the support 10 having a small radius of curvature (or if preferred over a small roller) whereby the strip is caused to make a relatively sharp turn and the support is arranged so that the turn occurs close to and in front of the slit 5. By means of a suitable lamp or lamps, preferably a single tubular lamp such as that shown at 11, the strip as it passes over the edge portion 9 is brightly illuminated, the lamp or lamps being positioned so that the illuminating rays pass the casing in a tangential manner.

As the tubular member rotates rapidly the material of the strip is scanned in successive transverse lines as it passes over the support. By suitable well known means operating in response to variations in the output of the photoelectric tube the presence of spots or imperfections in the strip may be readily detected.

What I claim as new and desire to secure by Letters Patent of the United States is:

1. Apparatus for continuously scanning a moving strip of material comprising a support having a small radius of curvature over which said strip is arranged to be drawn, a cylindrical casing having a narrow longitudinal light slit therein and arranged with the slit close to and parallel with said support, a tubular member within said casing and having therein a light slit arranged to cooperate with the slit in said casing, one of said slits having a spiral form, means mounting said casing and said tubular member for relative rotation, said tubular member having its interior surface coated with a highly reflecting material, a photoelectric device in said tubular member, supporting means for said photoelectric device, and means for projecting a beam of light on said strip where it passes over said support.

2. Apparatus for continuously scanning a moving strip of material comprising a support having an edge portion over which said strip is arranged to be drawn, a cylindrical casing having a narrow longitudinal light slit therein and arranged with the slit close to and parallel with said edge portion, a tubular member rotatably mounted within said casing and having therein a spiral light slit arranged to cooperate with the slit in said casing, said tubular member having its interior surface coated with highly reflecting material, a photoelectric tube supported by said casing at one end of said tubular member, and a source of light arranged to project light tangentially of said casing to illuminate that part of said strip passing over said edge portion.

CRAMER W. LA PIERRE.